US009595159B2

(12) United States Patent
Chun

(10) Patent No.: US 9,595,159 B2
(45) Date of Patent: Mar. 14, 2017

(54) SYSTEM AND METHOD FOR MULTI-GAME, MULTI-PLAY OF LIVE DEALER GAMES

(71) Applicant: IGT, Las Vegas, NV (US)

(72) Inventor: Jay Chun, Hong Kong (HK)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 14/866,503

(22) Filed: Sep. 25, 2015

(65) Prior Publication Data

US 2016/0012663 A1 Jan. 14, 2016

Related U.S. Application Data

(63) Continuation-in-part of application No. 14/043,184, filed on Oct. 1, 2013, now Pat. No. 9,390,592, and a (Continued)

(51) Int. Cl.

*A63F 13/00* (2014.01)
*G07F 17/32* (2006.01)
*A63F 9/24* (2006.01)

(52) U.S. Cl.

CPC .............. *G07F 17/322* (2013.01); *A63F 9/24* (2013.01); *G07F 17/3209* (2013.01); (Continued)

(58) Field of Classification Search

CPC .. G07F 17/32; G07F 17/3272; G07F 17/3288; G07F 17/3293; G07F 17/3213; A63F 2001/003

(Continued)

(56) References Cited

U.S. PATENT DOCUMENTS

| | | | |
|---|---|---|---|
| 3,708,219 A | 1/1973 | Forlini et al. |
| 3,998,309 A | 12/1976 | Mandas et al. |

(Continued)

FOREIGN PATENT DOCUMENTS

| | | |
|---|---|---|
| EP | 0478412 | 4/1992 |
| GB | 2403429 | 7/2006 |

(Continued)

*Primary Examiner* — Allen Chan

(74) *Attorney, Agent, or Firm* — Neal, Gerber & Eisenberg LLP

(57) ABSTRACT

A system and method for providing multiple synchronous games for multiple plays from a live table game located in a casino includes a physical game table, a physical game system for playing a live table game in connection with the physical game table to generate a single live game data sequence by a live dealer operating the physical game system, a game server to receive the single live game data sequence and generate multiple synchronous games from the single live game data sequence, and one or more electronic gaming terminals in communication with the game server, each of the one or more electronic gaming terminals having a display to display the multiple synchronous games and an input mechanism to input one or more wagers on the multiple synchronous games. The game server is configured to receive the one or more wagers on the multiple synchronous games from the one or more electronic game terminals, to provide the multiple synchronous games to the one or more electronic gaming terminals synchronously, to determine results of the multiple synchronous games, to resolve the one or more wagers on the multiple synchronous games synchronously from the one or more electronic game terminals, and to payout rewards on the multiple synchronous games to the one or more electronic game terminals.

28 Claims, 6 Drawing Sheets

Related U.S. Application Data continuation-in-part of application No. 14/864,334, filed on Sep. 24, 2015.

(52) U.S. Cl.
CPC ...... *G07F 17/3223* (2013.01); *G07F 17/3286* (2013.01); *G07F 17/3293* (2013.01); *A63F 2009/2457* (2013.01)

(58) Field of Classification Search
USPC ........................................................... 463/11
See application file for complete search history.

(56) References Cited

U.S. PATENT DOCUMENTS

| | | | |
|---|---|---|---|
| 4,095,795 | A | 6/1978 | Saxton |
| 4,333,715 | A | 6/1982 | Brooks |
| 4,337,945 | A | 7/1982 | Levy |
| 4,448,419 | A | 5/1984 | Telnaes |
| 4,467,424 | A | 8/1984 | Hedges et al. |
| 4,517,558 | A | 5/1985 | Davids |
| 4,607,844 | A | 8/1986 | Fullerton |
| 4,621,814 | A | 11/1986 | Stepan et al. |
| 4,659,182 | A | 4/1987 | Aizawa |
| 4,662,635 | A | 5/1987 | Enokian |
| 4,718,672 | A | 1/1988 | Okada |
| 4,805,907 | A | 2/1989 | Hagiwara |
| 4,856,787 | A | 8/1989 | Itkis |
| 4,858,932 | A | 8/1989 | Keane |
| 4,911,449 | A | 3/1990 | Dickinson et al. |
| 4,912,548 | A | 3/1990 | Shanker et al. |
| 5,086,354 | A | 2/1992 | Bass et al. |
| 5,113,272 | A | 5/1992 | Reamey |
| 5,132,839 | A | 7/1992 | Travis |
| 5,248,142 | A | 9/1993 | Breeding |
| 5,288,081 | A | 2/1994 | Breeding |
| 5,319,491 | A | 6/1994 | Selbrede |
| 5,325,830 | A | 7/1994 | Hammer |
| 5,342,047 | A | 8/1994 | Heidel et al. |
| 5,364,100 | A | 11/1994 | Ludlow et al. |
| 5,376,587 | A | 12/1994 | Buchmann et al. |
| 5,393,061 | A | 2/1995 | Manship et al. |
| 5,456,465 | A | 10/1995 | Durham |
| 5,467,893 | A | 11/1995 | Landis et al. |
| 5,472,194 | A | 12/1995 | Breeding et al. |
| 5,490,670 | A | 2/1996 | Hobert |
| 5,494,296 | A | 2/1996 | Grassa |
| 5,539,547 | A | 7/1996 | Ishii et al. |
| 5,544,892 | A | 8/1996 | Breeding |
| 5,580,055 | A | 12/1996 | Hagiwara |
| 5,580,310 | A | 12/1996 | Orus et al. |
| 5,585,821 | A | 12/1996 | Ishikura et al. |
| 5,586,937 | A | 12/1996 | Menashe |
| 5,588,650 | A | 12/1996 | Eman et al. |
| 5,589,980 | A | 12/1996 | Bass et al. |
| 5,611,730 | A | 3/1997 | Weiss |
| 5,613,909 | A | 3/1997 | Stelovsky |
| 5,618,232 | A | 4/1997 | Martin |
| 5,643,086 | A | 7/1997 | Alcorn et al. |
| 5,655,961 | A | 8/1997 | Acres et al. |
| 5,722,890 | A | 3/1998 | Libby et al. |
| 5,743,523 | A | 4/1998 | Kelly et al. |
| 5,743,798 | A | 4/1998 | Adams et al. |
| 5,745,197 | A | 4/1998 | Leung et al. |
| 5,752,881 | A | 5/1998 | Inoue |
| 5,752,882 | A | 5/1998 | Acres et al. |
| 5,759,103 | A | 6/1998 | Freels et al. |
| 5,762,552 | A | 6/1998 | Vuong et al. |
| 5,764,317 | A | 6/1998 | Sadovnik et al. |
| 5,766,076 | A | 6/1998 | Pease et al. |
| 5,772,509 | A | 6/1998 | Weiss |
| RE35,864 | E | 7/1998 | Weingardt |
| 5,782,692 | A | 7/1998 | Stelovsky |
| 5,788,574 | A | 8/1998 | Ornstein et al. |
| 5,791,992 | A | 8/1998 | Crump et al. |
| 5,795,225 | A | 8/1998 | Jones et al. |
| 5,797,795 | A | 8/1998 | Takemoto et al. |
| 5,800,268 | A | 9/1998 | Molnick |
| 5,803,451 | A | 9/1998 | Kelly et al. |
| 5,820,459 | A | 10/1998 | Acres et al. |
| 5,820,461 | A | 10/1998 | Pernatozzi |
| 5,830,067 | A | 11/1998 | Graves et al. |
| 5,836,817 | A | 11/1998 | Acres et al. |
| 5,839,730 | A | 11/1998 | Pike |
| 5,839,731 | A | 11/1998 | Feola |
| 5,851,149 | A | 12/1998 | Xidos et al. |
| 5,873,781 | A | 2/1999 | Keane |
| 5,885,085 | A | 3/1999 | Fujita |
| 5,888,136 | A | 3/1999 | Herbert |
| 5,910,046 | A | 6/1999 | Wada et al. |
| 5,911,626 | A | 6/1999 | McCrea, Jr. |
| 5,931,471 | A | 8/1999 | Bonito |
| 5,951,397 | A | 9/1999 | Dickinson |
| 5,956,180 | A | 9/1999 | Bass et al. |
| 5,967,893 | A | 10/1999 | Lawrence et al. |
| 6,001,016 | A | 12/1999 | Walker et al. |
| 6,015,346 | A | 1/2000 | Bennett |
| 6,019,374 | A | 2/2000 | Breeding |
| 6,027,115 | A | 2/2000 | Griswold et al. |
| 6,039,650 | A | 3/2000 | Hill |
| 6,050,895 | A | 4/2000 | Luciano et al. |
| 6,054,969 | A | 4/2000 | Haisma |
| 6,056,641 | A | 5/2000 | Webb |
| 6,059,658 | A | 5/2000 | Mangano et al. |
| 6,080,063 | A | 6/2000 | Khosla |
| 6,083,105 | A | 7/2000 | Ronin et al. |
| 6,113,493 | A | 9/2000 | Walker et al. |
| 6,135,884 | A | 10/2000 | Hedrick et al. |
| 6,142,876 | A | 11/2000 | Cumbers |
| 6,149,522 | A | 11/2000 | Alcorn et al. |
| 6,159,098 | A | 12/2000 | Slomiany et al. |
| 6,165,069 | A | 12/2000 | Sines et al. |
| 6,213,875 | B1 | 4/2001 | Suzuki |
| 6,244,596 | B1 | 6/2001 | Kondratjuk |
| 6,251,014 | B1 | 6/2001 | Stockdale et al. |
| 6,252,707 | B1 | 6/2001 | Kleinberger et al. |
| 6,254,481 | B1 | 7/2001 | Jaffe |
| 6,264,561 | B1 | 7/2001 | Saffari |
| 6,312,334 | B1 | 11/2001 | Yoseloff |
| 6,315,666 | B1 | 11/2001 | Mastera et al. |
| 6,336,857 | B1 | 1/2002 | McBride |
| 6,337,513 | B1 | 1/2002 | Clevenger et al. |
| 6,347,996 | B1 | 2/2002 | Gilmore et al. |
| 6,368,216 | B1 | 4/2002 | Hedrick et al. |
| 6,379,244 | B1 | 4/2002 | Sagawa et al. |
| 6,394,907 | B1 | 5/2002 | Rowe |
| 6,398,220 | B1 | 6/2002 | Inoue |
| 6,416,827 | B1 | 7/2002 | Chakrapani et al. |
| 6,435,970 | B1 | 8/2002 | Baerlocher et al. |
| 6,444,496 | B1 | 9/2002 | Edwards et al. |
| 6,445,185 | B1 | 9/2002 | Damadian et al. |
| 6,491,583 | B1 | 12/2002 | Gauselmann |
| 6,503,147 | B1 | 1/2003 | Stockdale et al. |
| 6,508,709 | B1 | 1/2003 | Karmarkar |
| 6,511,375 | B1 | 1/2003 | Kaminkow |
| 6,512,559 | B1 | 1/2003 | Hashimoto et al. |
| 6,514,141 | B1 | 2/2003 | Kaminkow et al. |
| 6,517,073 | B1 | 2/2003 | Vancura |
| 6,517,433 | B2 | 2/2003 | Loose et al. |
| 6,517,437 | B1 | 2/2003 | Wells et al. |
| 6,547,664 | B2 | 4/2003 | Saunders |
| 6,575,541 | B1 | 6/2003 | Hedrick et al. |
| 6,575,834 | B1 | 6/2003 | Lindo |
| 6,585,591 | B1 | 7/2003 | Baerlocher et al. |
| 6,607,195 | B2 | 8/2003 | Vancura |
| D480,961 | S | 10/2003 | Deadman |
| 6,646,695 | B1 | 11/2003 | Gauselmann |
| 6,652,378 | B2 | 11/2003 | Cannon et al. |
| 6,659,864 | B2 | 12/2003 | McGahn et al. |
| 6,661,425 | B1 | 12/2003 | Hiroaki |
| 6,676,517 | B2 | 1/2004 | Beavers |
| 6,685,567 | B2 | 2/2004 | Cockerille et al. |
| 6,695,703 | B1 | 2/2004 | McGahn |
| 6,702,675 | B2 | 3/2004 | Poole et al. |

(56) References Cited

U.S. PATENT DOCUMENTS

| | | | |
|---|---|---|---|
| 6,712,694 | B1 | 3/2004 | Nordman |
| 6,715,756 | B2 | 4/2004 | Inoue |
| 6,717,728 | B2 | 4/2004 | Putilin |
| 6,722,979 | B2 | 4/2004 | Gilmore et al. |
| 6,726,565 | B2 | 4/2004 | Hughs-Baird |
| 6,789,801 | B2 | 9/2004 | Snow |
| 6,802,777 | B2 | 10/2004 | Seelig et al. |
| 6,804,763 | B1 | 10/2004 | Stockdale et al. |
| 6,817,945 | B2 | 11/2004 | Seelig et al. |
| 6,817,946 | B2 | 11/2004 | Motegi et al. |
| 6,863,608 | B1 | 3/2005 | LeMay et al. |
| 6,866,586 | B2 | 3/2005 | Oberberger et al. |
| 6,887,157 | B2 | 5/2005 | LeMay et al. |
| 6,890,259 | B2 | 5/2005 | Breckner et al. |
| 6,906,762 | B1 | 6/2005 | Witehira et al. |
| 6,937,298 | B2 | 8/2005 | Okada |
| 7,029,395 | B1 | 4/2006 | Baerlocher |
| 7,128,647 | B2 | 10/2006 | Muir |
| 7,204,753 | B2 | 4/2007 | Ozaki et al. |
| 7,220,181 | B2 | 5/2007 | Okada |
| 7,252,288 | B2 | 8/2007 | Seelig et al. |
| 7,255,643 | B2 | 8/2007 | Ozaki et al. |
| 7,303,473 | B2 | 12/2007 | Rowe |
| 7,309,284 | B2 | 12/2007 | Griswold et al. |
| 7,322,884 | B2 | 1/2008 | Emori et al. |
| 7,326,115 | B2 | 2/2008 | Baerlocher |
| 7,329,179 | B2 | 2/2008 | Baerlocher |
| 7,329,181 | B2 | 2/2008 | Hoshino et al. |
| 7,351,146 | B2 | 4/2008 | Kaminkow |
| 7,387,570 | B2 | 6/2008 | Randall |
| 7,452,270 | B2 | 11/2008 | Walker et al. |
| 7,465,227 | B2 | 12/2008 | Baerlocher |
| 7,470,185 | B2 | 12/2008 | Baerlocher |
| 7,488,251 | B2 | 2/2009 | Kaminkow |
| 7,503,849 | B2 | 3/2009 | Hornik et al. |
| 7,537,456 | B2 | 5/2009 | Snow |
| 7,566,274 | B2 | 7/2009 | Johnson et al. |
| 7,575,512 | B2 | 8/2009 | Kennedy |
| 7,591,726 | B2 | 9/2009 | Baerlocher et al. |
| 7,618,319 | B2 | 11/2009 | Casey et al. |
| 7,666,086 | B2 | 2/2010 | Baerlocher |
| 7,666,087 | B2 | 2/2010 | Hughs-Baird |
| 7,699,698 | B2 | 4/2010 | Randall |
| 7,753,798 | B2 | 7/2010 | Soltys et al. |
| 7,758,419 | B2 | 7/2010 | Rowe et al. |
| 7,775,524 | B2 | 8/2010 | Lutnick et al. |
| 7,789,743 | B2 | 9/2010 | Walker et al. |
| 7,819,744 | B2 | 10/2010 | Hughs-Baird |
| 7,822,641 | B2 | 10/2010 | Abbott et al. |
| 7,828,643 | B2 | 11/2010 | Baerlocher |
| 7,837,547 | B2 | 11/2010 | Cannon |
| 7,846,018 | B2 | 12/2010 | Baerlocher |
| 7,867,077 | B2 | 1/2011 | Baerlocher et al. |
| 7,878,892 | B2 | 2/2011 | Sines et al. |
| 7,905,771 | B2 | 3/2011 | Walker et al. |
| 7,905,774 | B2 | 3/2011 | Walker et al. |
| 7,914,372 | B2 | 3/2011 | Tessmer et al. |
| 7,931,531 | B2 | 4/2011 | Oberberger |
| 7,950,993 | B2 | 5/2011 | Oberberger |
| 7,963,845 | B2 | 6/2011 | Baerlocher |
| 7,967,674 | B2 | 6/2011 | Baerlocher |
| 7,976,378 | B2 | 7/2011 | Baerlocher |
| 7,980,948 | B2 | 7/2011 | Rowe et al. |
| 8,020,866 | B2 | 9/2011 | Walker et al. |
| 8,066,564 | B2 | 11/2011 | Randall |
| 8,087,999 | B2 | 1/2012 | Oberberger et al. |
| 8,109,821 | B2 | 2/2012 | Kovacs et al. |
| 8,128,491 | B2 | 3/2012 | Vasquez et al. |
| 8,128,492 | B2 | 3/2012 | Vasquez et al. |
| 8,152,624 | B2 | 4/2012 | Gerrard et al. |
| 8,152,629 | B2 | 4/2012 | DeWaal et al. |
| 8,167,711 | B2 | 5/2012 | Baerlocher |
| 8,172,660 | B2 | 5/2012 | Lancaster et al. |
| 8,177,627 | B2 | 5/2012 | Baerlocher |
| 8,182,323 | B2 | 5/2012 | Okada |
| 8,197,335 | B2 | 6/2012 | DeWaal et al. |
| 8,202,153 | B2 | 6/2012 | Baerlocher |
| 8,206,212 | B2 | 6/2012 | Iddings et al. |
| 8,231,456 | B2 | 7/2012 | Zielinski |
| 8,235,801 | B2 | 8/2012 | Tan |
| 8,267,765 | B2 | 9/2012 | Baerlocher |
| 8,305,550 | B2 | 11/2012 | Jung et al. |
| 8,313,373 | B2 | 11/2012 | Walker et al. |
| 8,317,589 | B2 | 11/2012 | Tessmer et al. |
| 8,342,954 | B2 | 1/2013 | Oberberger et al. |
| 8,360,852 | B2 | 1/2013 | Randall |
| 8,360,859 | B2 | 1/2013 | Walker et al. |
| 8,403,740 | B2 | 3/2013 | Kovacs et al. |
| 8,425,305 | B2 | 4/2013 | Baerlocher et al. |
| 8,430,735 | B2 | 4/2013 | Oberberger |
| 8,430,739 | B2 | 4/2013 | Rodgers |
| 8,454,427 | B2 | 6/2013 | Baerlocher |
| 8,460,095 | B2 | 6/2013 | Tan |
| 8,474,820 | B2 | 7/2013 | Walker et al. |
| 8,485,888 | B2 | 7/2013 | Baerlocher |
| 8,496,521 | B2 | 7/2013 | Randall |
| 8,500,533 | B2 | 8/2013 | Lutnick et al. |
| 8,506,380 | B2 | 8/2013 | Hughes et al. |
| 8,517,824 | B2 | 8/2013 | Zielinski et al. |
| 8,613,650 | B2 | 12/2013 | Kovacs et al. |
| 9,135,775 | B2 | 9/2015 | Pececnik |
| 9,214,056 | B2 | 12/2015 | Kovacs et al. |
| 2001/0013681 | A1 | 8/2001 | Bruzzese et al. |
| 2002/0045472 | A1 | 4/2002 | Adams |
| 2002/0068635 | A1 | 6/2002 | Hill |
| 2002/0077712 | A1 | 6/2002 | Safaei et al. |
| 2002/0094869 | A1 | 7/2002 | Harkham |
| 2002/0173354 | A1 | 11/2002 | Winans et al. |
| 2003/0013510 | A1* | 1/2003 | Vuong .................... G07F 17/32 463/13 |
| 2003/0027624 | A1 | 2/2003 | Gilmore et al. |
| 2003/0032478 | A1 | 2/2003 | Takahama et al. |
| 2003/0032479 | A1 | 2/2003 | LeMay et al. |
| 2003/0060271 | A1 | 3/2003 | Gilmore et al. |
| 2003/0073497 | A1 | 4/2003 | Nelson |
| 2003/0087690 | A1 | 5/2003 | Loose et al. |
| 2003/0130028 | A1 | 7/2003 | Aida et al. |
| 2003/0176214 | A1 | 9/2003 | Burak et al. |
| 2003/0203756 | A1 | 10/2003 | Jackson |
| 2003/0224854 | A1 | 12/2003 | Joao |
| 2003/0232651 | A1* | 12/2003 | Huard ..................... G07F 17/32 463/42 |
| 2003/0234489 | A1 | 12/2003 | Okada |
| 2003/0236114 | A1 | 12/2003 | Griswold et al. |
| 2003/0236118 | A1 | 12/2003 | Okada |
| 2004/0002379 | A1 | 1/2004 | Parrott et al. |
| 2004/0023714 | A1 | 2/2004 | Asdale |
| 2004/0029636 | A1 | 2/2004 | Wells |
| 2004/0063490 | A1 | 4/2004 | Okada |
| 2004/0066475 | A1 | 4/2004 | Searle |
| 2004/0070146 | A1 | 4/2004 | Snow |
| 2004/0084843 | A1 | 5/2004 | Snow |
| 2004/0090003 | A1 | 5/2004 | Snow |
| 2004/0090005 | A1 | 5/2004 | Snow |
| 2004/0116178 | A1 | 6/2004 | Okada |
| 2004/0145116 | A1 | 7/2004 | Calvo et al. |
| 2004/0147303 | A1 | 7/2004 | Imura et al. |
| 2004/0147314 | A1 | 7/2004 | LeMay et al. |
| 2004/0150162 | A1 | 8/2004 | Okada |
| 2004/0162146 | A1 | 8/2004 | Ooto |
| 2004/0166925 | A1 | 8/2004 | Emori et al. |
| 2004/0171423 | A1 | 9/2004 | Silva et al. |
| 2004/0183972 | A1 | 9/2004 | Bell |
| 2004/0192430 | A1 | 9/2004 | Burak et al. |
| 2004/0198485 | A1 | 10/2004 | Loose et al. |
| 2004/0207154 | A1 | 10/2004 | Okada |
| 2004/0209666 | A1 | 10/2004 | Tashiro |
| 2004/0209667 | A1 | 10/2004 | Emori et al. |
| 2004/0209668 | A1 | 10/2004 | Okada |
| 2004/0209671 | A1 | 10/2004 | Okada |
| 2004/0209678 | A1 | 10/2004 | Okada |
| 2004/0209683 | A1 | 10/2004 | Okada |
| 2004/0214635 | A1 | 10/2004 | Okada |
| 2004/0214637 | A1 | 10/2004 | Nonaka |

(56) References Cited

U.S. PATENT DOCUMENTS

| | | | |
|---|---|---|---|
| 2004/0224747 | A1 | 11/2004 | Okada |
| 2004/0233663 | A1 | 11/2004 | Emslie et al. |
| 2004/0239582 | A1 | 12/2004 | Seymour |
| 2005/0003886 | A1 | 1/2005 | Englman et al. |
| 2005/0032571 | A1 | 2/2005 | Asonuma |
| 2005/0037843 | A1 | 2/2005 | Wells et al. |
| 2005/0049032 | A1 | 3/2005 | Kobayashi |
| 2005/0049046 | A1 | 3/2005 | Kobayashi |
| 2005/0062410 | A1 | 3/2005 | Bell et al. |
| 2005/0063055 | A1 | 3/2005 | Engel |
| 2005/0079913 | A1 | 4/2005 | Inamura |
| 2005/0085292 | A1 | 4/2005 | Inamura |
| 2005/0153772 | A1 | 7/2005 | Griswold et al. |
| 2005/0153775 | A1 | 7/2005 | Griswold et al. |
| 2005/0176493 | A1 | 8/2005 | Nozaki et al. |
| 2005/0176507 | A1 | 8/2005 | Ephrati et al. |
| 2005/0192090 | A1 | 9/2005 | Muir et al. |
| 2005/0192099 | A1 | 9/2005 | Nguyen et al. |
| 2005/0206582 | A1 | 9/2005 | Bell et al. |
| 2005/0208994 | A1 | 9/2005 | Berman |
| 2005/0233799 | A1 | 10/2005 | LeMay et al. |
| 2005/0233803 | A1 | 10/2005 | Yang |
| 2005/0239539 | A1 | 10/2005 | Inamura |
| 2005/0266912 | A1 | 12/2005 | Sekiguchi |
| 2005/0282625 | A1 | 12/2005 | Nicely |
| 2005/0285337 | A1 | 12/2005 | Durham et al. |
| 2006/0030399 | A1 | 2/2006 | Baerlocher |
| 2006/0040733 | A1 | 2/2006 | Baerlocher |
| 2006/0073882 | A1 | 4/2006 | Rozkin et al. |
| 2006/0092170 | A1 | 5/2006 | Bathiche et al. |
| 2006/0100014 | A1 | 5/2006 | Griswold et al. |
| 2006/0103951 | A1 | 5/2006 | Bell et al. |
| 2006/0125745 | A1 | 6/2006 | Evanicky |
| 2006/0135240 | A1 | 6/2006 | Barshack |
| 2006/0166727 | A1 | 7/2006 | Burak |
| 2006/0189382 | A1 | 8/2006 | Muir et al. |
| 2006/0191177 | A1 | 8/2006 | Engel |
| 2006/0258446 | A1 | 11/2006 | Nguyen et al. |
| 2006/0284574 | A1 | 12/2006 | Emslie et al. |
| 2006/0290594 | A1 | 12/2006 | Engel et al. |
| 2007/0004510 | A1 | 1/2007 | Underdahl et al. |
| 2007/0010315 | A1 | 1/2007 | Hein |
| 2007/0015583 | A1* | 1/2007 | Tran ........................ G07F 17/32 463/40 |
| 2007/0021198 | A1 | 1/2007 | Muir et al. |
| 2007/0129123 | A1 | 6/2007 | Eryou et al. |
| 2007/0243927 | A1* | 10/2007 | Soltys ..................... G07F 17/32 463/25 |
| 2008/0020816 | A1 | 1/2008 | Griswold et al. |
| 2008/0020839 | A1 | 1/2008 | Wells et al. |
| 2008/0020840 | A1 | 1/2008 | Wells et al. |
| 2008/0020841 | A1 | 1/2008 | Wells et al. |
| 2008/0064467 | A1 | 3/2008 | Reiner |
| 2008/0146344 | A1 | 6/2008 | Rowe et al. |
| 2008/0149705 | A1 | 6/2008 | Giobbi et al. |
| 2008/0182650 | A1 | 7/2008 | Randall et al. |
| 2008/0231611 | A1 | 9/2008 | Bathiche et al. |
| 2008/0248865 | A1 | 10/2008 | Tedesco et al. |
| 2008/0305855 | A1 | 12/2008 | Czyzewski et al. |
| 2008/0318668 | A1 | 12/2008 | Ching et al. |
| 2009/0029766 | A1 | 1/2009 | Lutnick et al. |
| 2009/0111573 | A1 | 4/2009 | Iddings |
| 2010/0111820 | A1 | 5/2010 | Natura et al. |
| 2010/0120506 | A1 | 5/2010 | Davis et al. |
| 2010/0130280 | A1 | 5/2010 | Arezina et al. |
| 2010/0234086 | A1 | 9/2010 | Michaelson |
| 2011/0111824 | A1 | 5/2011 | Cuddy et al. |
| 2012/0178511 | A1* | 7/2012 | Katz ....................... G07F 17/32 463/11 |

FOREIGN PATENT DOCUMENTS

| | | |
|---|---|---|
| WO | WO 99/19027 | 4/1999 |
| WO | WO 99/42889 | 8/1999 |
| WO | WO 99/44095 | 9/1999 |
| WO | WO 01/09664 | 2/2001 |
| WO | WO 01/15127 | 3/2001 |
| WO | WO 01/15128 | 3/2001 |
| WO | WO 01/15132 | 3/2001 |
| WO | WO 04/001486 | 12/2003 |
| WO | WO 2004/102520 | 11/2004 |
| WO | WO 2006/034192 | 3/2006 |
| WO | WO 2006/038819 | 4/2006 |
| WO | WO 2007/032945 | 3/2007 |
| WO | WO 2007/073534 | 6/2007 |

* cited by examiner

SYSTEM AND METHOD FOR MULTI-GAME, MULTI-PLAY OF LIVE DEALER GAMES

CROSS-REFERENCE TO RELATED APPLICATION(S)

The present application is a continuation-in-part application of co-pending and commonly owned U.S. Ser. No. 14/043,184, filed Oct. 1, 2013, now published as U.S. Patent Application Publication No. 2014/0094232, and co-pending and commonly owned U.S. Ser. No. 14/864,334, filed Sep. 24, 2015, the entire disclosure of both applications are expressly incorporated by reference.

COPYRIGHT NOTICE

The figures included herein contain material that is subject to copyright protection. The copyright owner has no objection to the facsimile reproduction by anyone of this patent document as it appears in the U.S. Patent and Trademark Office, patent file or records, but reserves all copyrights whatsoever in the subject matter presented herein.

TECHNICAL FIELD

The present invention relates generally to the field of games suitable for use in casinos and other gaming establishments or online gaming where games are played on remote gaming devices as a live-action game. More particularly, the present invention relates to a system and method for providing multiple synchronous games for multiple plays from a live table game.

BACKGROUND OF THE INVENTION

The most popular skill games including card games have been played for hundreds of years. Wagering card games such as baccarat, blackjack, and various poker-based games are popular games offered in casinos. These games are generally played on physical gaming tables having felt layouts, or electronic and electromechanical gaming machines in which a dealer, playing cards, chips or other gaming elements may be virtual. Each of these platforms have a limited capacity for players to participate in any particular game due to a limited number of player positions or a limitation on physical space about the table.

Baccarat is one of the many popular live table games played in casinos or gaming establishments. Baccarat uses a standard deck of fifty-two cards and is usually dealt from a shoe having multiple decks (commonly eight) that have been shuffled together and loaded into shoe for dealing prior to the beginning of play of a round of hands. The object of the game of Baccarat is for the bettor to successfully wager on whether the Banker's hand or the Player's hand will win the hand of play. Bettors have no discretion concerning the play of the hands, since cards are dealt according to pre-established rules. Their options prior to the dealing of a hand of Baccarat are to not bet, bet with either the Banker hand or the Player hand and/or to wager that the hands will tie. In some establishments an additional wager is allowed, which is to wager that either the Banker hand or the Player hand will be a Natural, i.e. a two card total, modulo 10, of 8 or 9.

The introduction and growing popularity of live table systems with remote gaming terminals has essentially extended the capacity of a live table game to include remote players in the game. The gaming terminals are therefore configured to facilitate the participation of remotely seated players in a live table game. The term "live dealer games" refer to games in which players participate in the live game at the table, from a location remote from the area of live play but are still at the casino, or both. A live dealer game may be available for a variety of live casino games, such as, for example, roulette, craps, baccarat, blackjack, poker, etc. During a live dealer game, a remote player participates in the same game that a local player does. The remote player may receive game data from the game server, such as what cards have been dealt by a live dealer or played by a local player, and also transmits information to the game server, such as what wagers have been made or cards played by the remote player. Additionally, the information communicated to the remote player from the game server may include a live video feed of game-play at the gaming table, and also an indication of game data generated, such as a rank and suit of each dealt card, the result of a roulette wheel spin, the value of a dice thrown, etc.

While live table systems have increased the capacity for players to participate in live table games, the systems have not increased the wagering game options for players who participate in the live table game. Thus, it can be seen that there is a need in the art for a system and method that, among other things, provides additional wagering game options.

It is, therefore, desirable to provide a new system and method that provides multiple games for multiple play by a player. It is also desirable to provide a new system and method that provides multiple wagering games from a live table game. It is further desirable to provide a new system and method that provides multiple games for multiple plays and wagering opportunities on electronic gaming terminals and mobile devices. Thus, there is a need in the art to provide a new system and method for providing multiple synchronous games for multiple plays from a live table game that meet one or more of these desires.

SUMMARY OF THE INVENTION

The present invention is generally directed to systems and methods for providing multiple synchronous games for multiple plays from a live table game where wagers or bets are placed. The games are played on electronic gaming terminals and/or on mobile devices. In the present invention, there is a single stream of live game data sequence, generated by a live dealer operating a physical game system, in a casino. The single live game data sequence, such as the cards dealt in a card game, is captured by the physical game system, such as an electronic card shoe. By applying multiple sets of game rules to the same live game data sequence, multiple games can be created, each with a different payout structure (pay table). Additionally, all the games are played synchronously—all games start at the same time, all bets need to be placed within the same time window, game results evaluated at the same time, and rewards given out at the same time. In short, multiple games can be played simultaneously within the single original game cycle.

In one aspect of the present invention, a system for providing multiple synchronous games for multiple plays from a live table game located in a casino includes a physical game table and a physical game system for playing a live table game in connection with the physical game table to generate a single live game data sequence by a live dealer operating the physical game system. The system also includes a game server to receive the single live game data sequence and generate multiple synchronous games from the single live game data sequence. The game server has memory for storing rules, logic, and payout tables of the multiple synchronous games and applies the rules, logic, and payout tables to the single live game data sequence to generate the multiple synchronous games. The system further includes one or more electronic gaming terminals in communication with the game server, each of the one or more electronic gaming terminals having a display to display the multiple synchronous games and an input mechanism to input one or more wagers on the multiple synchronous games. The game server is configured to receive the one or more wagers on the multiple synchronous games from the one or more electronic game terminals, to provide the multiple synchronous games to the one or more electronic gaming terminals synchronously, to determine results of the multiple synchronous games, to resolve the one or more wagers on the multiple synchronous games synchronously from the one or more electronic game terminals, and to payout rewards on the multiple synchronous games to the one or more electronic game terminals.

In another aspect of the present invention, a method for providing multiple synchronous games for multiple plays from a live table game located in a casino includes the steps of locating a physical game table, playing a live table game with a physical game system in connection with the physical game table, and generating a single live game data sequence by a live dealer operating the physical game system. The method also includes the steps of receiving, by a game server, the single live game data sequence and generating, by the game server, multiple synchronous games from the single live game data sequence. The game server has memory for storing rules, logic, and payout tables of the multiple synchronous games and applies the rules, logic, and payout tables to the single live game data sequence to generate the multiple synchronous games. The method further includes the steps of communicating, by the game server, with one or more electronic gaming terminals, each of the one or more gaming terminals having a display to display the multiple synchronous games and an input mechanism for inputting one or more wagers on the multiple synchronous games. The method also includes the steps of receiving, by the game server, the one or more wagers on the multiple synchronous games from the one or more electronic gaming terminals and providing, by the game server, the multiple synchronous games to the one or more electronic gaming terminals synchronously. The method further includes the steps of determining, by the game server, results of the multiple synchronous games, resolving, by the game server, the one or more wagers on the multiple synchronous games synchronously from the one or more electronic gaming terminals and paying out, by the game server, rewards on the multiple synchronous games to the one or more electronic game terminals.

One advantage of the present invention is that a new system and method is provided for providing multiple synchronous games for multiple plays from a live table game such as cards, roulette, slots, or other games of skill. Another advantage of the present invention is that the system and method provides the same deal of cards, for example, and multiple table skins with multiple pay tables, game rules, and side bets or wagers. Yet another advantage of the present invention is that the system and method distributes the same live game data sequence to electronic game terminals and/or mobile devices. Still another advantage of the present invention is that the system and method provides player's choice on games, games played synchronously on the same live game data sequence of a live game play. A further advantage of the present invention is that the system and method allows the same wager to be split among games, duplicated to other synchronous games, and alerts the player to game streaks or patterns in the synchronous games.

Other features and advantages of the present invention will be readily appreciated, as the same becomes better understood, after reading the subsequent description taken in conjunction with the accompanying drawings.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
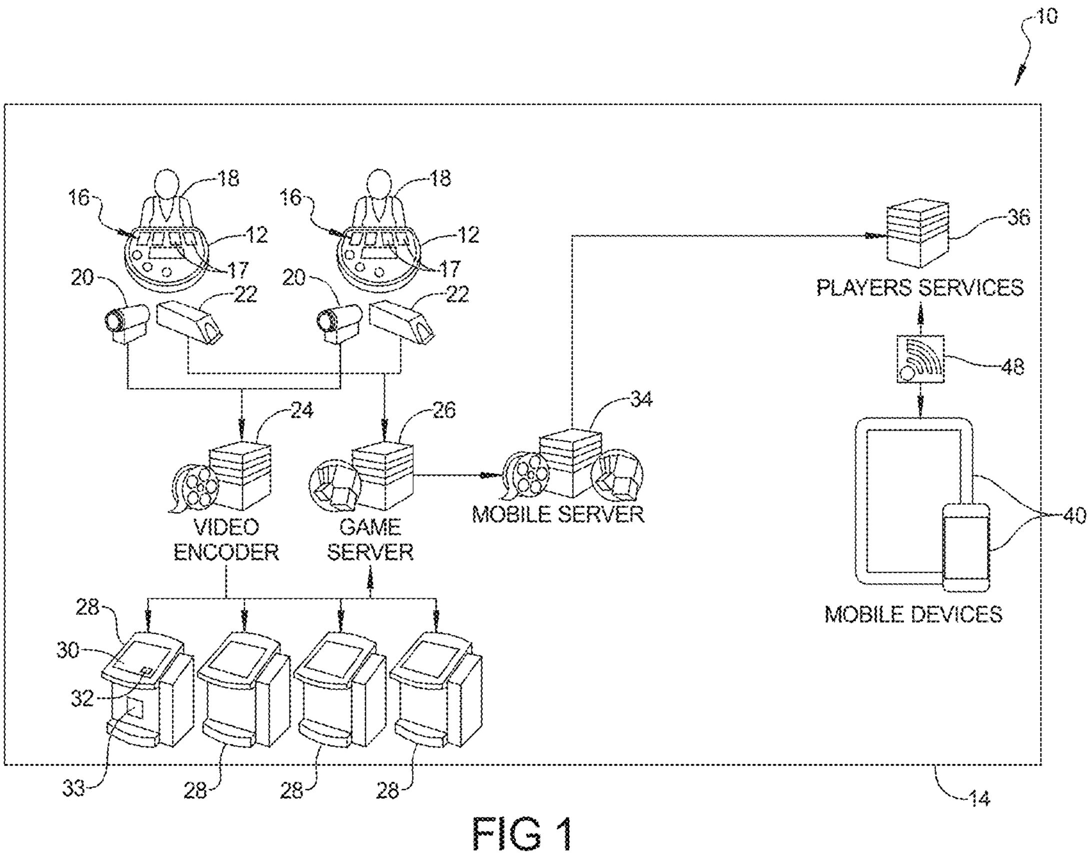
FIG. 1 is a schematic representation of an exemplary system for providing multiple synchronous games for multiple plays from a live table game, according to an embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION OF THE PREFERRED EMBODIMENT(S)

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis.

The present invention includes systems and methods for providing, conducting and facilitating play of multiple synchronous games at an electronic platform through the use of live game data. It is contemplated that the multiple synchronous games may possess characteristics, such as the wagering opportunities and/or game rules.

The present invention may be applied to any live table game, such as baccarat, blackjack, roulette, craps, pai gow, sic bo, bingo, card games, or any other type of game having a live dealer and one or more players using an electronic gaming terminal, and/or mobile device.

As discussed herein, the present invention may also be applied in a live table system that monitors a live table game in which physical or virtual cards are dealt to one or more players at a gaming table, or other physical game components are employed such as dice, and collects the randomly generated game play data. The game play data collected is used to enable play of the same live table game remotely through gaming terminals. The gaming terminals may be any platform capable of receiving and transmitting data, including "thin-client" platforms or platforms which do not process game play data and "smart" platforms or platforms which process game play data. The gaming terminal maybe stationary, similar to the slot machines or electronic tables commonly seen at the physical casino, or maybe portable electronic devices such as smart phones, computer tablets, portable media players, laptop computers, desktop computers, smart TV, and the like. Additionally, the gaming network they attach to can be of wired (Ethernet, Token Ring, Serial multidrop, etc.) or wireless variety (802.11x, BlueTooth, LTE, 2G/3G/4G cellular, Zigbee, Ultra Wide Band, etc.) known in the art. It should be appreciated that players interested in placing wagers on a live-table game are not confined to the gaming table or even the casino floor.

Referring to FIG. 1, one embodiment of a system 10, according to the present invention, for providing multiple synchronous games for multiple plays from a live table game is illustrated. In the illustrated embodiment, the system 10 includes at least one physical game table 12 located in a live play area or gaming space such as a casino 14. The system 10 also includes a physical game system, generally indicated at 16, for playing a live table game in connection with the physical game table 12 to generate a single live game data sequence by a live dealer 18 operating the physical game system 16. In one embodiment, the system 10 may include one or more physical game tables 12, one or more physical game systems 16, and one or more live dealers 18. The physical game system 16 includes as least one of the following: an electronic card shoe, a shoe controller, a plurality of physical cards, a dealer display, and a network interface for a card game; a wheel, a controller, a ball, a ball drop sensor, a dealer display, and a network interface for a roulette game; a set of dice, a controller, a dealer display, and a network interface for a dice game; and a plurality of spinning reels, a controller, a dealer display, and a network interface for a slot game. In the embodiment illustrated, the physical game system 16 includes a plurality of physical cards 17 for a card game such as Baccarat and an electronic card shoe 22. It should be appreciated that the physical cards 17 are shuffled and loaded into the electronic card shoe 22 for dealing to play the card game. It should also be appreciated that one live dealer 18 may operate one or more live table games on the physical game table 12 in connection with one or more physical game systems 16, each physical game system 16 generating a single live game data sequence. For example, a physical game table 12 may have two physical game systems 16—an electronic shoe system 22 for a card game, and an electronic roulette wheel system (not shown) for a roulette game. Both the card game and the roulette game systems may be operated by the same live dealer 18, in an alternating manner. It should further be appreciated that the live game data sequence is, for one example, the order in which the physical cards 17 are dealt or, for another example, the spinning of the roulette wheel, dropping the ball on the wheel, and the ball finally resting on one spot of the wheel. It should still further be appreciated that a more detailed description of the card game Baccarat is disclosed in U.S. Pat. No. 6,217,447 to Lofink et al., the entire disclosure of which is hereby expressly incorporated by reference.

Specific components of the system 10 may be referenced using functional terminology in their names. The function terminology is used solely for purposes of naming convention and to distinguish one element from another in the following discussion. Unless otherwise specified, the name of an element conveys no specific functionality to the element or component. It should be appreciated that, in selected embodiments, the software, hardware, and associated components of the system 10 may be programmed and configured to implement one or more embodiments described herein. It should also be appreciated that the various aspects of the system 10 may be exemplified as software, modules, nodes, etc. of a computer or server.

Figure 2:
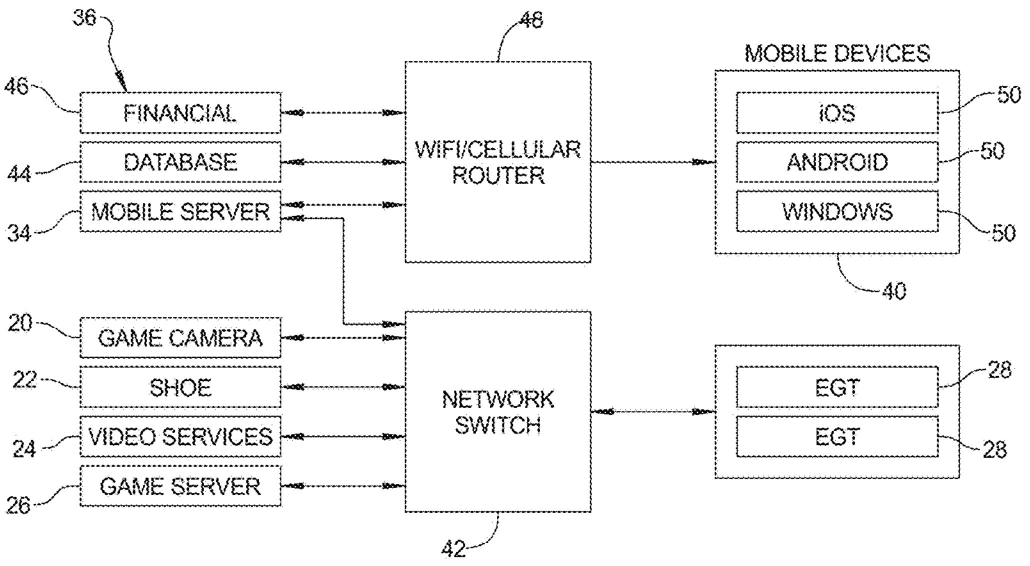
FIG. 2 is a schematic representation of an exemplary network for the system of FIG. 1., according to an embodiment of the present invention.

Referring to FIGS. 1 and 2, the system 10 also includes at least one camera 20 for recording video of the single live game data sequence generated by the physical game system 16. In the embodiment illustrated, there are two cameras 20 with one camera 20 for each live dealer 18. The camera 20 may be positioned in a variety of locations to capture all the gaming activity occurring at the physical game table 12, the dealer 18 playing the physical game system 16 in connection with the game table 12, or just the hands of the dealer 18 playing the physical game system 16 in connection with the game table 12. For example, the camera 20 may be situated above the game table 12, pointed toward the dealer 18, or placed inside or under a rim of the game table 12 and directed toward the center of the table 12 (to capture a dealt card that is viewed by the dealer 18). In another embodiment, multiple cameras 20 may be used, each focusing on one aspect of the physical table game 12. For example, one camera 20 may be positioned to capture the live dealer 18, another camera 20 may be pointed at the card shoe 22, and yet another camera 20 may be zoomed in to the dealt cards on the physical game table 12. Each camera 20 records a live video feed of game-play at the game table 12, which is transmitted over a network shown in FIG. 2. The live feed may include a digital or analog signal representing gaming action captured by the camera 20. It should be appreciated that the camera 20 provides a live broadcast of the game actions at the physical table game 12 to the one or more game terminals 28. It should also be appreciated that this video stream is normally for informational purposes only (e.g., the players can verify that the dealer operate the game correctly). It should still further be appreciated that a more detailed description of a live dealer game is disclosed in U.S. Pat. No. 8,348,763 to Moshal et al., the entire disclosure of which is hereby expressly incorporated by reference.

The system 10 includes at least one of a video encoder and/or a video transcoder 24 in communication with the at least one camera 20. In the embodiment illustrated, there are two video encoders/transcoders 24 in communication with the two cameras 20, one video encoder/transcoder 24 being associated with one camera 20 for each live dealer 18. It should be appreciated that the video encoder/transcoder 24 encodes the digital video from the camera 20 to meet proper formats and specifications for recording and broadcasting through the use of video broadcasting systems.

The system 10 also includes a game server 26 in communication with at least one physical game system 16 to receive the single live game data sequence and generate multiple synchronous games from the single live game data sequence. In one embodiment, the game server 26 includes a processor and a memory (not shown) for storing rules, logic, and payout tables of the multiple synchronous games and applies the rules, logic, and payout tables to the single live game data sequence to generate the multiple synchronous games. The game server 26 may also include a database 44 for storing information or be coupled to a database 44 to access information. The game server 26 is in communication with the one or more physical game systems 16. In the illustrated embodiment, the game server 26 is coupled to each electronic card shoe 22 via a communications link such as a network switch (FIG. 2) that enables communication over a network, such as, for example, the Internet, a cellular telecommunications network, a wireless network and/or any suitable communication network. It should be appreciated that the gamer server 26 is configured to carry out the methodologies to be subsequently described. It should also be appreciated that the game server 26 may be programmed in a suitable language to carry out the methodologies to be subsequently described.

The game server 26 may be arranged in a variety of configurations and may include a communication interface that receives and transmits game play data which is randomly generated as a result of playing the live table game, a processor that facilitates comparing the live game data with the rules and/or criteria for winning the wagers stored in data storage and determines an outcome of the wagers placed on the live table game via a data communication device of the electronic gaming terminal 28 to be described. The game server 26 is configured to receive the one or more wagers on the multiple synchronous games from the one or more electronic game terminals 28, to provide the multiple synchronous games to the one or more electronic gaming terminals 28 synchronously, to determine the results or outcomes of the multiple synchronous games, to resolve the one or more wagers on the multiple synchronous games synchronously from the one or more electronic game terminals 28, and to payout rewards on the multiple synchronous games to the one or more electronic game terminals 28. It should be appreciated that the game server 26 may perform functions described below by executing computer-readable program instructions stored in data storage to enable a plurality of electronic gaming devices to each play a separate instance of one or more live dealer games, to determine the outcome of game-play decisions and game results at a live dealer game, to transmit the game results to one or more electronic gaming terminals 28 to be described, to operate in conjunction with a larger online gaming system (e.g., a separate gaming server, an online casino website, or a web server), or to manage a remote player's credit account, for example. It should be appreciated that the electronic gaming terminal 28 may be of the type disclosed in U.S. Ser. No. 14/864,334, filed Sep. 24, 2015, the entire disclosure of which is hereby incorporated by reference.

The system 10 further includes one or more electronic gaming terminals 28 in communication with the game server 26. Each of the electronic gaming terminals 28 has a display 30 to display the multiple synchronous games from the game server 26 and an input mechanism 32 to input one or more wagers on the multiple synchronous games. In the illustrated embodiment, each electronic gaming terminal 28 includes a controller 33 that is coupled to the display 30 and the input mechanism 32 and a communications device (not shown).

The controller 33 receives and transmits information to and from the game server 26 and displays the games and the graphical interfaces on the display 30 to enable a player or user to interact with the game server 26 to play the games in accordance with the embodiments described herein. The display 30 includes, without limitation, a flat panel display, such as a cathode ray tube display (CRT), a liquid crystal display (LCD), a light-emitting diode display (LED), active-matrix organic light-emitting diode (AMOLED), a plasma display, and/or any suitable visual output device capable of displaying graphical data and/or text to a user. Moreover, the input mechanism 32 includes, without limitation, buttons, a keyboard, a keypad, a touch-sensitive screen, a scroll wheel, a pointing device, a barcode reader, a magnetic card reader, a radio frequency identification (RFID) card reader, an audio input device employing speech-recognition software, gestures, and/or any suitable device that enables a user to input data into the controller 33 and/or to retrieve data from the controller 33. It should be appreciated that a single component, such as a touch screen, a capacitive touch screen, and/or a touchless screen, may function as both the display 30 and as the input mechanism 32. It should also be appreciated that the display 30 is configured to facilitate the entry of wagers, show a live multimedia feed of the table game being played and communicate the outcome of any wagers placed.

The system 10 may include a mobile server 34 in communication with the game server 26 via the network switch 42 to output the multiple synchronous games to one or more mobile devices 40 to be described. The mobile server 34 may be arranged in a variety of configurations and may include a processor and a communication interface that receives and transmits game play data from the game server 26.

The system 10 may include a player tracking server 36 in communication with the mobile server and the one or more mobile devices to allow remote play of the multiple synchronous games and to track the remote play of the multiple synchronous games. The player tracking server 36 provides games, accounting, and financial services for mobile players. The player tracking server 36 may include memory for storage of a database 44 for tracking games and player data and a financial database 46 for storing financial data and for processing financial transactions related to the player wagering such as money transfers, deposits, withdrawals, balance monitoring, etc.

The system 10 also may include a wireless or cellular router 48 in communication with the mobile server 34, player tracking server 36, and one or more mobile devices 40 that enables communication over a network, such as, for example, the Internet, a cellular telecommunications network, a wireless network and/or any suitable telecommunication network.

The system 10 may further include one or more mobile devices 40 in communication with the wireless router 48. Each of the mobile devices 40 has a display to display the multiple synchronous games from the game server 26 and an input mechanism to input one or more wagers on the multiple synchronous games. The mobile device 40 includes a processor operating system 50 such as iOS, Android, or Windows. The processor operating system 50 communicates with the mobile server 34 and the player tracking server 36 via the wireless router 48 and the cellular telecommunications network and/or the Internet. In one embodiment, the mobile device 40 may include a personal computer, laptop, cell phone, tablet computer, Smartphone/tablet computer hybrid, personal/home video game device, personal data assistant, and/or any suitable computing device that enables a player to connect to the mobile server 34 and the player tracking server 36 and display the graphical interfaces.

Figure 3:
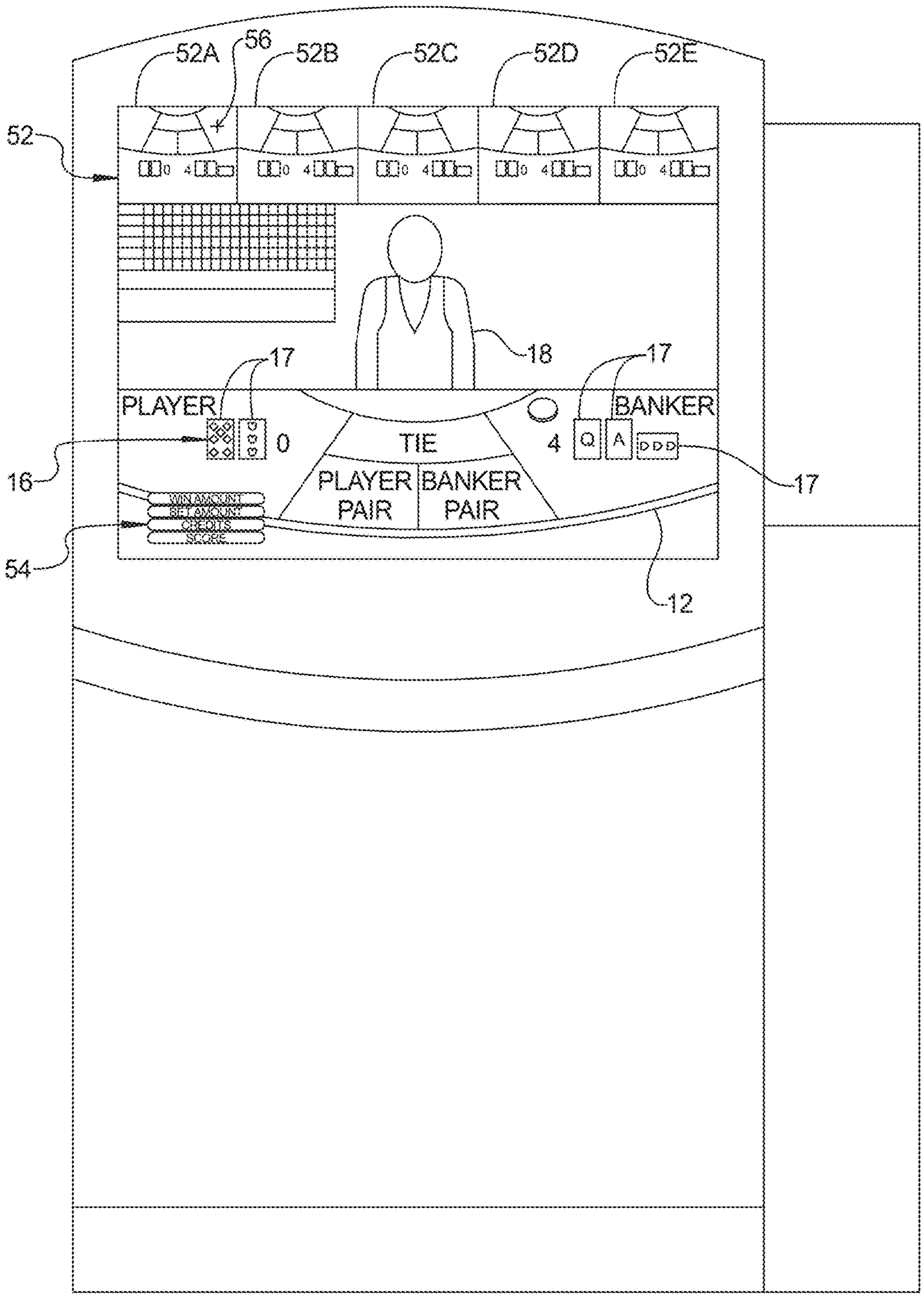
FIG. 3 is a screenshot of a multiple synchronous games for multiple plays from a live table game, according to an embodiment of the present invention.

Referring to FIG. 3, the system 10 is also configured to provide the multiple synchronous games at the electronic gaming terminals 28 and/or mobile devices 40. The multiple synchronous games have common features with the live table game that permit the game play data, which are received as a result of playing the live table game, to be used by the game server 26 for resolving the multiple synchronous games 52 according to the respective rules and/or criteria associated with the multiple synchronous games 52 stored in data storage of the game server 26. It should be appreciated that the system 10 is therefore configured for communicating the multiple synchronous games 52 via the electronic gaming terminals 28, which may be advantageously played have different wagers, different rules, or both, to resolve wagers in the multiple synchronous games are generated as a result of playing the live table games. It should be appreciated that the everything is controlled by the game server 26 because the game server 26 gets the live game data, control the game flow sequence, and applies different sets of rules/pay tables to create multiple synchronous game 52, tells each electronic game terminal 28 to display the games 52, sets the bet or wager window, waits for the bets or wagers, gets the report from each game terminal 28 and/or mobile device 40 of the bet or wager amount on each game 52, resolves each game 52, calculates pay outs, store game results, and sends results for local displays at the game terminals 28 and/or mobile devices 40.

The system 10 may be configured to provide a new display, sub-screen, or skin on display 30 of the electronic gaming terminal 28 and/or mobile device 40 for each of the multiple synchronous games 52. The term "skin" refers to the computer-generated graphical theme presented on the surface of each virtual table. To differentiate, each virtual table (game) may have a different skin theme. The skins may be different colors or identifications such as Table 1, 2, 3, etc. As illustrated in FIG. 3, the game server 26 is configured to allow one or more of the multiple synchronous games 52A-52E to be chosen and played on each of the one or more electronic gaming terminals 28. The game server 26 is configured to provide multiple table skins among the multiple synchronous games 52A-52E chosen and played on each of the one or more electronic gaming terminals 28 and/or mobile devices 40. The game server 26 is configured to provide multiple payout tables, provide multiple game rules, and allow multiple side bets among the multiple synchronous games 52A-52E chosen and played on each of the one or more electronic gaming terminals 28 and/or mobile devices 40. It should be appreciated that variations in game rules, wager size, and pay tables affecting payout amounts and volatility that are applied to the single live game data sequence generated at the physical game table 12 to create the multiple synchronous games 52 at the electronic gaming terminals 28 and/or mobile devices 40 to provide a variety of personalized player experience. It should also be appreciated that the player's choice of the multiple synchronous games 52 are played synchronously (all games start, play, and stop at the same time) based on the single live gaming data sequence.

The game server 26 is configured to provide a different set of accounting meters, generally indicated at 54, for each of the multiple synchronous games 52. The accounting meters 54 include at least one of a win amount, bet or wager amount, accumulative wager amount, credits won, accumulative credit won, credits available, score, number of games won, and number of games lost. It should be appreciated that each of the individual sub-screen (for the different flavors of game) displays some, but not all, of the accounting meters 54, for example: Bet Amount (current game flavor), Total Bet Amount (all flavors of the same game), Credits Won, Credits Available (the purse) may be displayed when a virtual table 52 is zoomed in or chosen, but may not be shown when minimized to a widget on the virtual table 52 surface.

The game server 26 is configured to allow the player to touch the icon for the multiple synchronous games 52 to place a wager or bet on one of the multiple synchronous games 52 chosen. In one embodiment, the player touches the icon for game 52A and wagers ten dollars ($10.00) on the game 52A. In another embodiment, the game server 26 is configured to allow a same one of the one or more wagers to be split among the multiple synchronous games 52 chosen. In the embodiment illustrated, a player may wager ten dollars ($10.00) to be split among games 52A-52E and therefore a wager of two dollars ($2.00) is placed on each of the games 52A-52E. In yet another embodiment, the game server 26 is configured to allow a same one of the one or more wagers to be duplicated among the multiple synchronous games 52 chosen. In the embodiment illustrated, a player may wager ten dollars ($10.00) to be duplicated among the games 52A-52E and therefore a wager of ten dollars ($10.00) is placed on each of the games 52A-52E. It should be appreciated that by touching the icon for an individual one of the games 52A-52E, the icon/widget is enlarged for the player to view the particular game in progress, to place one or more wagers, to examine the game history, etc. It should be appreciated that a pay table can also be displayed or brought out to allow the player to see the pay schedule, e.g., two Kings pays 5× the wager. It also should be appreciated that the game terminals 28 and/or mobile devices 40 also have local intelligence, especially in collecting the wagers, by interfacing with each player, reads the player inputs (individual bets, split the bet among multiple flavors, replicate the bets) and reports to the game server 26. It should further be appreciated that the game terminal 28 can also apply different skins for each game 52, monitor the various games 52 for game streaks (whether preset game streaks, or a certain player-specified streak) and alerts the player when that event happens. It should still further be appreciated that, while the game server 26 can do this, preferably this activity is done at the local game terminal 28 and/or mobile device 40 in order to reduce the server-client communication traffic.

The game server 26 is configured to notify the one or more electronic gaming terminals 28 and/or mobile devices 40 of streaks within the multiple synchronous games 52A-52E displayed thereon. In one embodiment, the gamer server 26 may display a visual alert 56 next to or on one or more of the games 52A-52E. The game server 26 is configured to allow a player to choose one or more game streaks or any other event to be monitored through the electronic gaming terminal 28 and/or mobile device 40. It should be appreciated that the player notification allows a player to monitor game patterns (topics) and alert the player of streaks. The term "streak" refers to a pattern of occurrences, or lack thereof, of game outcomes or events. For example, one pattern may be that the game outcomes of a baccarat table in the past 10 minutes (or in the past 20 games) show that the number of player-win/banker-win ratio exceeded the statistical average by a 15% margin. Another pattern may be that the banker bet has won 5 games in a row. Depending on the pattern, players may place a bet according to their preferences. Similarly, in a roulette game, if the game outcomes in the past period show that there is a ratio imbalance between red and black, odd and even, etc., then the players may bet on a particular game outcome in the next game. It should also be appreciated that the player can start a new wager in a new game that has a streak alert, or up the existing wager or wagers when a streak is hit.

For example, the game of Baccarat may be played live and broadcast to the electronic gaming terminals 28 and/or mobile devices 40, along with multiple synchronous baccarat variant games that include different rules, such as no-commission versions, variations on pay tables, or which include additional side wagers, which may include progressive side wagers, mystery jackpots or bonuses. Thus, players at electronic gaming terminal 28 and/or mobile devices 40 are capable of participating in many variations of baccarat games with the same hand delivered in the live table game.

In another embodiment of Baccarat known as "EZ Baccarat", the game server 26 is configured to allow side bets or wagers such as "Dragon" or "Panda". EZ Baccarat plays as regular baccarat except that it replaces the taking of the commission on every winning Bank hand by barring one specific winning Bank hand such as a three card total of seven. The appearance of this hand is the "Dragon". Players can make a side bet or insurance bet, the Dragon 7, bet that pays 40 to 1 when the three card winning Bank hand occurs. The Panda 8 is a side bet in EZ Baccarat, along with the Dragon 7 bet. The rules of EZ Baccarat are the same as those of conventional baccarat, except there is no 5% commission on winning Banker bets. However, a winning Banker bet with a 3-card 7 will push. To cover this contingency, they also offer the player the Dragon 7 bet, which pays 40 to 1 for a 3-card Banker total of 7. Later came the Panda 8 bet, which pays 25 to 1 for a 3-card winning Player total of 8. It should be appreciated that the side bets or wagers may be placed on the electronic gaming terminal 28 and/or mobile device 40.

In the present invention, the game server 26 includes a broad category of electronic communication systems that may communicate with one or more devices in the gaming space and with one or more electronic gaming devices operated by remote players. For example, the game server 26 may receive gaming data from the electronic gaming device, such as an indication of cards played, bets wagered, etc. Further, the game server 26 may be arranged to communicate with entities not depicted in FIG. 1, such as other gaming devices, a web server, or administrative facilities. It should be appreciated that each player plays synchronously—all bets need to be placed within the same time window, game results evaluated at the same time, and rewards given out at the same time.

Figure 4:
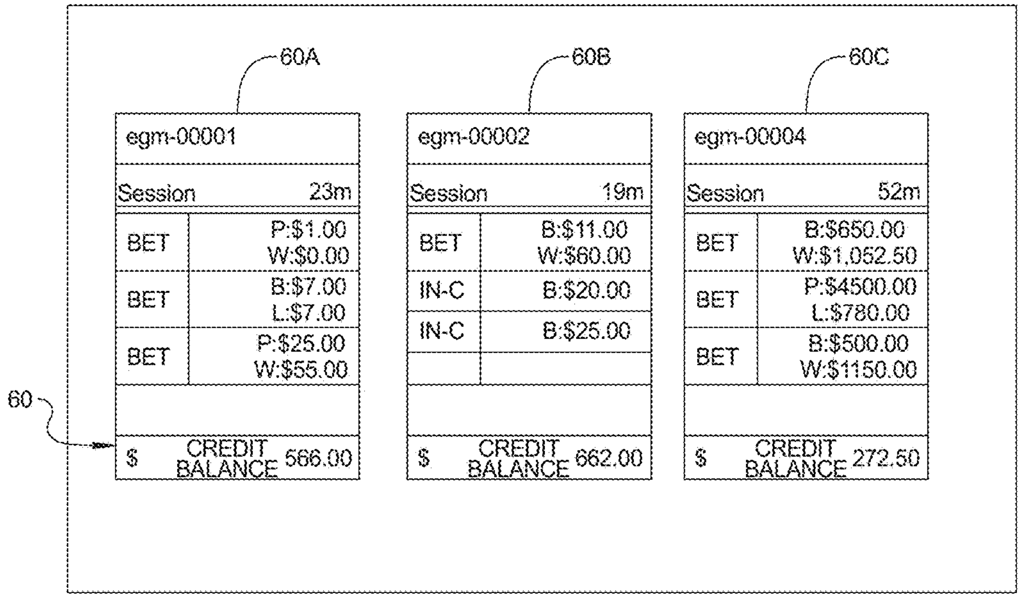
FIG. 4 illustrates an example of virtual tables for multiple synchronous games from a live table game, according to an embodiment of the present invention.

Referring to FIG. 4, the player tracking server 36 may monitor each game 52A-52E synchronously to track bets or wagers. The player tracking server 36 may include a plurality of virtual tables 60 to allow an administrator to track player wagers. In the embodiment illustrated, the virtual tables 60 include tables 60A, 60B, and 60C to represent games 1, 2, and 4, respectively. Each of the virtual tables 60A, 60B, and 60C track the specific game, the time played on the game, the wagers or bets on the game, the amount won on the wagers or bets, the total amount won, the credit balance, etc.

Figure 5:
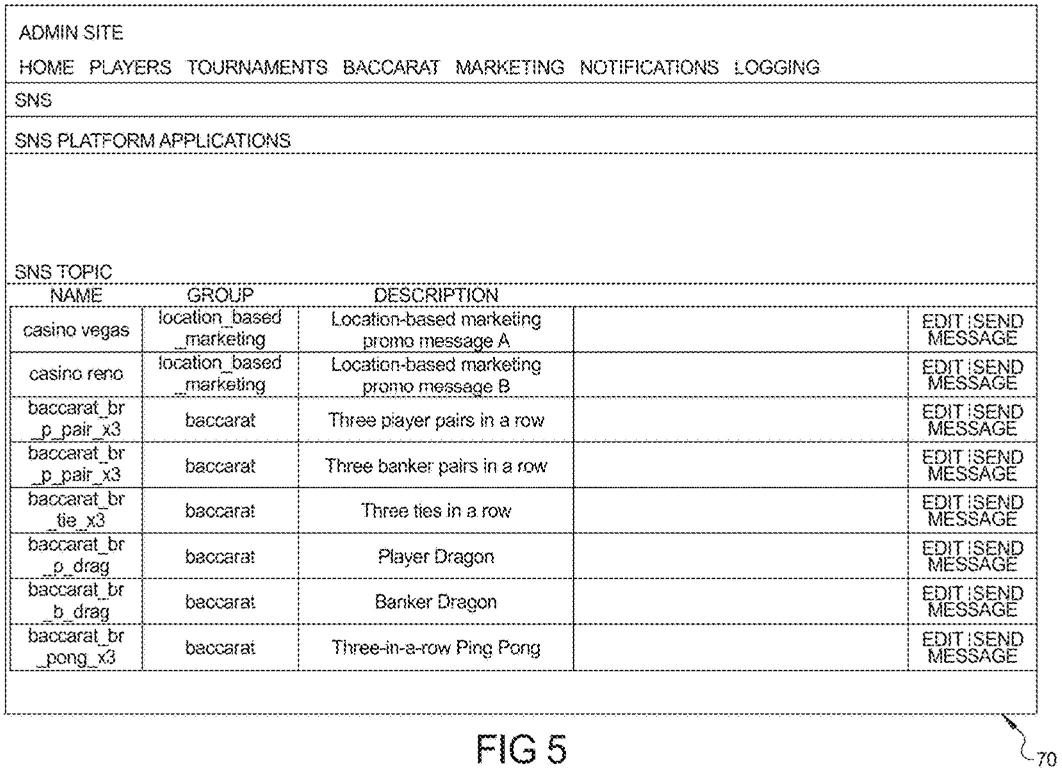
FIG. 5 is a screen shot of an administrative site for tracking the players and the game play activities on the game terminals, according to an embodiment of the present invention.

Referring to FIG. 5, the player tracking server 36 may monitor each game 52A-52E synchronously and provide information as an administrative site. The administrator of the administrative site may be able to know the location of the gaming terminals 28 and/or mobile devices 40 and which gaming terminals 28 and/or mobile devices 40 have wins for the games 52 based on the live gaming data. It should be appreciated that FIG. 5 is a screenshot 70 of the administrative site and the data is used for tracking purposes by the administrator.

Figure 6:
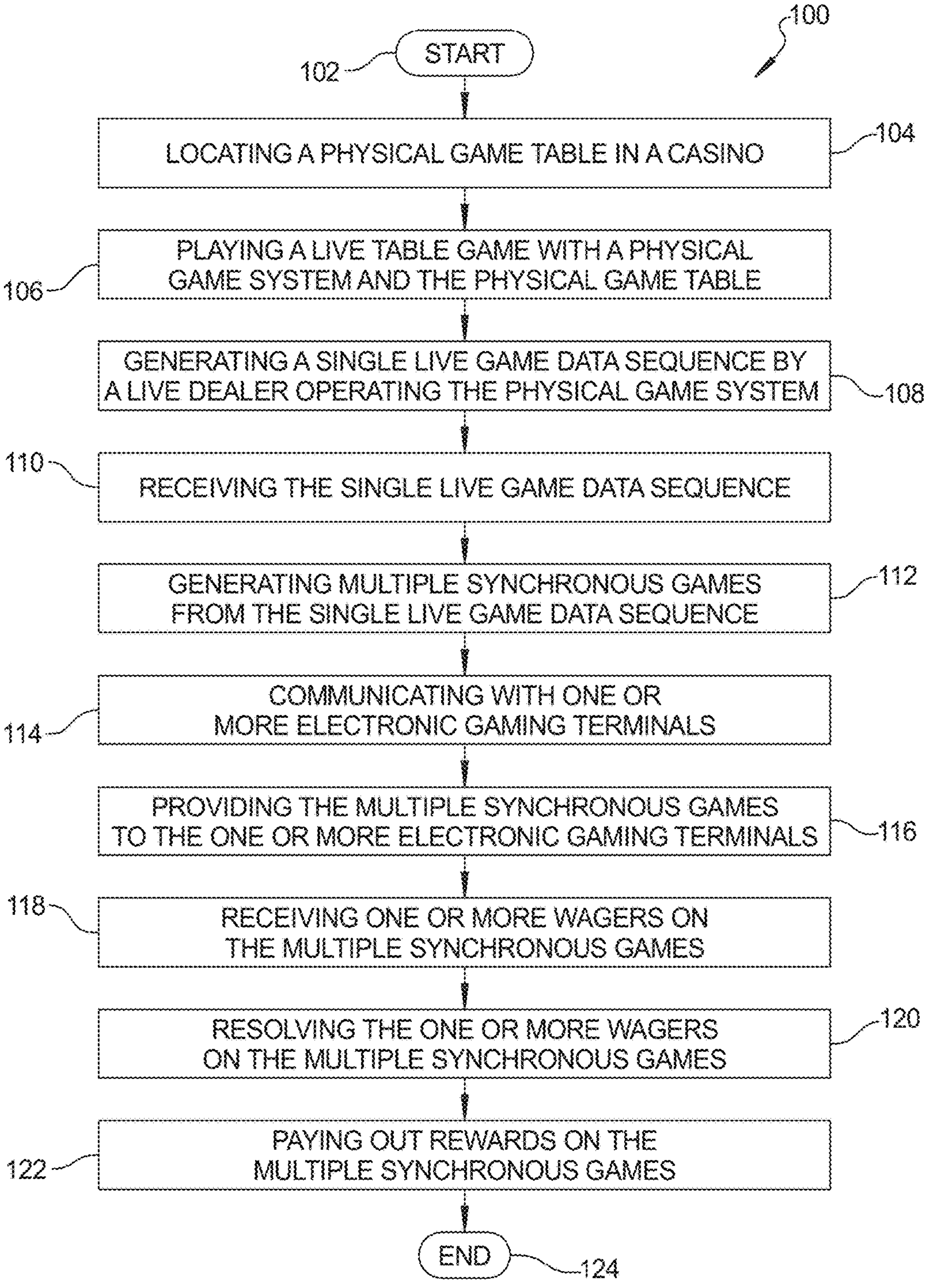
FIG. 6 is a flowchart of a method for providing multiple synchronous games for multiple plays from a live table game, according to an embodiment of the present invention.

Referring to FIG. 6, a flowchart of a method 100 for providing multiple synchronous games for multiple play from a live table game. The method 100 starts in block 102 and advances to block 104. In block 104, the method includes the step of locating a physical game table 12 in a casino 14. The physical game table 12 is located in a gaming space such as the casino 14. The method 100 advances to block 106 and includes the step of playing a live table game with a physical game system 16 in connection with the physical game table 12 and generating a single live game data sequence by a live dealer operating the physical game system 16. The live dealer 18 plays a live table game such as Baccarat with the physical game system 16 such as cards 17 and electronic card shoe 22 with the game table 12 in the casino 14. The method 100 then advances to block 108 and includes the step of generating a single live game data sequence by a live dealer 18 operating the physical game system 16. The live dealer 18 deals the cards 17 of the physical game system 16 to generate a single live game data of the cards 17 dealt. The method 100 then advances to block 110 and includes the step of receiving the single live game data sequence. In block 110, the game server 26 receives the single live game data sequence. The method 100 advances to block 112 and includes the step of generating multiple synchronous games from the single live game data sequence. In block 112, the game server 26 generates multiple synchronous games 52 from the single live game data sequence. It should be appreciated that the game server 26 has memory for storing rules, logic, and payout tables of the multiple synchronous games and applies the rules, logic, and payout tables to the single live game data sequence to generate the multiple synchronous games 52.

Next, the method 100 advances to block 114 and includes the step of communicating with one or more electronic gaming terminals 28 and/or mobile devices 40. In block 114, the game server 26 communicates with one or more electronic gaming terminals 28 and/or mobile devices 40. It should be appreciated that each of the one or more gaming terminals 28 and/or mobile devices 40 have a display to display the multiple synchronous games 52 and an input mechanism for inputting one or more wagers on the multiple synchronous games 52.

The method 100 advances to block 116 and includes the step of providing the multiple synchronous games 52 to the one or more electronic gaming terminals 28 and/or mobile devices 40 synchronously. In block 116, the game server 26 provides the multiple synchronous games 52 to the one or more electronic gaming terminals 28 and/or mobile devices 40 synchronously. The method 100 advances to block 118 and includes the step of receiving the one or more wagers on the multiple synchronous games 52. In block 118, the game server 26 receives the one or more wagers on the multiple synchronous games 52 synchronously from the one or more electronic gaming terminals 28 and/or mobile devices 40. The method 100 advances to block 120 and includes the step of resolving the one or more wagers on the multiple synchronous games 52. In block 120, the game server 26 resolves the one or more wagers on the multiple synchronous games 52 synchronously from the one or more electronic gaming terminals 28 and/or mobile devices 40. The method 100 then advances to block 122 and includes the step of paying out rewards on the multiple synchronous games 52. In block 122, the game server 26 pays out rewards such as credits on the multiple synchronous games 52 synchronously to the one or more electronic game terminals 28 and/or mobile devices 40. The method then advances to block 124 and ends.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described. For instance, instead of using a live dealer operating on an electronic card shoe system to generate random cards for the game baccarat, a computer-generated 3D graphic representation of the human dealer can be used in conjunction with a Random Number Generator (RNG) to generate the cards for the game.

What is claimed is:

1. A gaming system comprising:

a physical game table configured to enable a play of a live table game;

a physical game table device configured to generate a single live game data sequence in association with the play of the live table game;

at least one electronic gaming terminal including:

a display device, and an input device configured to receive any placements of any wagers; and a game server in communication with the physical game table device and the at least one electronic gaming terminal and configured to:

(a) receive the single live game data sequence, (b) apply at least one stored modification to the single live game data sequence to generate multiple synchronous games from the single live game data sequence, (c) determine an outcome for each of the generated multiple synchronous games, and (d) for each of the at least one electronic gaming terminal:

(i) receive data associated with a wager placed on at least one of the multiple synchronous games, (ii) for each wagered on synchronous game, synchronously determine an award, said determination being based on the determined outcome for said synchronous game, and (iii) communicate data to said electronic gaming terminal to cause said electronic gaming terminal to display said determined award.

2. The gaming system of claim 1, which includes at least one camera configured to record video of the single live game data sequence.

3. The gaming system of claim 2, which includes at least one of a video encoder and a video transcoder in communication with the at least one camera and the game server.

4. The gaming system of claim 1, wherein the physical game table device includes as least one of:

an electronic card shoe, a shoe controller, a plurality of physical cards, and a network interface for a card game;

a wheel, a wheel controller, a ball, a ball drop sensor, and a network interface for a roulette game;

a set of dice, a dice controller, and a network interface for a dice game; and a plurality of spinning reels, a reel controller, and a network interface for a slot game.

5. The gaming system of claim 1, wherein the game server is configured to provide a different set of accounting meters for each of the multiple synchronous games.

6. The gaming system of claim 5, wherein the accounting meters include at least one of: a wager amount, an accumulative wager amount, an amount of credits won, an accumulative amount of credit won, an amount of credits available, a number of games won, and a number of games lost.

7. The gaming system of claim 1, wherein the game server is configured to enable at least one of the multiple synchronous games to be chosen and played on each of a plurality of electronic gaming terminals.

8. The gaming system of claim 7, wherein the game server is configured to enable a same wager to be split among the multiple synchronous games.

9. The gaming system of claim 8, wherein the game server is configured to enable a same wager to be duplicated among the multiple synchronous games.

10. The gaming system of claim 8, wherein the game server is configured to enable multiple side bets among the multiple synchronous games.

11. The gaming system of claim 8, wherein the game server is configured to provide multiple table skins among the multiple synchronous games.

12. The gaming system of claim 1, wherein the game server is configured to monitor for any game streaks within the multiple synchronous games.

13. The gaming system of claim 1, which includes a mobile server in communication with the game server to output the multiple synchronous games to at least one mobile device.

14. The gaming system of claim 13, which includes a player tracking server in communication with the mobile server and the at least one mobile device to:

enable remote play of the multiple synchronous games, and track the remote play of the multiple synchronous games.

15. A method of operating a gaming system, said method comprising:

(a) enabling a play of a live table game at a physical game table;

(b) causing a physical game table device associated with the physical game table to generate a single live game data sequence in association with the play of the live table game;

(c) receiving, by a game server, the single live game data sequence, (d) applying, by the game server, at least one stored modification to the single live game data sequence to generate multiple synchronous games from the single live game data sequence;

(e) receiving, by the game server, data associated with each wager placed on the multiple synchronous games from one or more electronic gaming terminals each having a display device configured to display the multiple synchronous games and an input device configured to receive any wagers on the multiple synchronous games;

(f) determining, by the game server, an outcome for each of the generated multiple synchronous games, and (g) for each of the multiple synchronous games wagered on by at least one of the electronic gaming terminals, synchronously determining an award, said determination being based on the determined outcome for said synchronous game.

16. The method of claim 15 including the step of recording, by at least one camera, video of the single live game data sequence.

17. The method as set forth in claim 16 including the step of providing at least one of a video encoder and a video transcoder and communicating with the at least one camera and the game server.

18. The method as set forth in claim 15 including the step of providing the physical game table device as least one of: an electronic card shoe, a shoe controller, a plurality of physical cards, and a network interface for a card game; a wheel, a controller, a ball, a ball drop sensor, and a network interface for a roulette game; a set of dice, a controller, and a network interface for a dice game; and a plurality of spinning reels, a controller, and a network interface for a slot game.

19. The method of claim 15 which includes providing, by the game server, a different set of accounting meters for each of the multiple synchronous games.

20. The method of claim 19 which includes providing the accounting meters as at least one of: a wager amount, an accumulative wager amount, an amount credits won, an accumulative credit won, an amount of credits available, a number of games won, and a number of games lost.

21. The method of claim 15 which includes enabling, by the game server, at least one of the multiple synchronous games to be chosen and played on each of the electronic gaming terminals.

22. The method of claim 21 which includes enabling, by the game server, a same wager to be split among the multiple synchronous games.

23. The method of claim 21 which includes enabling, by the game server, a same wager to be duplicated among the multiple synchronous games.

24. The method of claim 21 which includes enabling, by the game server, multiple side bets among the multiple synchronous games.

25. The method of claim 21 which includes providing, by the game server, multiple table skins among the multiple synchronous games.

26. The method of claim 15 which includes monitoring and notifying, by the game server, for any game streaks within the multiple synchronous games.

27. The method of claim 15 which includes outputting, by a mobile server in communication with the game server, the multiple synchronous games to at least one mobile device.

28. The method of claim 15 which includes enabling, by a player tracking server in communication with the mobile server and the at least one mobile device, remote play of the multiple synchronous games and to track the remote play of the multiple synchronous games.

* * * * *